(12) United States Patent
Feinberg

(10) Patent No.: US 8,103,644 B2
(45) Date of Patent: Jan. 24, 2012

(54) DATA ACCESS LAYER CLASS GENERATOR

(75) Inventor: Bonnie N. Feinberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1785 days.

(21) Appl. No.: 11/033,646

(22) Filed: Jan. 12, 2005

(65) Prior Publication Data

US 2006/0155720 A1  Jul. 13, 2006

(51) Int. Cl.
*G06F 17/30* (2006.01)
(52) U.S. Cl. ........................................ 707/705
(58) Field of Classification Search ........... 707/3–10, 707/100, 101, 705–721, 755–760
See application file for complete search history.

(56) References Cited

U.S. PATENT DOCUMENTS

| 7,113,942 B2 * | 9/2006 | Levanoni et al. ................. 707/3 |
| 2002/0099738 A1 * | 7/2002 | Grant ........................... 707/513 |
| 2003/0154239 A1 * | 8/2003 | Davis et al. .................... 709/201 |
| 2003/0167277 A1 | 9/2003 | Hejlsberg et al. |
| 2004/0199636 A1 | 10/2004 | Brown et al. |
| 2005/0044197 A1 * | 2/2005 | Lai ................................. 709/223 |
| 2005/0289041 A1 * | 12/2005 | Chowdary ....................... 705/37 |

OTHER PUBLICATIONS

Defintion of Data Access Layer, wikipedia.*
Definition of Automatic, The Free Dictionary.*
European Search Report dated Feb. 12, 2007 for European Patent Application No. 05 112 366.9, 5 pages.
Pervasive Software Inc. NET Data Providers for Pervasive SQL. Technical Paper—Revision 1.0. Aug. 2004. Pages 1-18. http://pervasive.com/documentation/techPapers/pdf/Technical_Paper_PervasiveSQL_Net.pdf.

* cited by examiner

*Primary Examiner* — Wilson Lee
(74) *Attorney, Agent, or Firm* — Workman Nydegger

(57) ABSTRACT

Systems and methods that that automatically generate a data access layer for a middle tier of a relational data store with stored procedures, via a data access layer generator. The data access layer generator can employ an extensible mark up language extension (XML) to determine the stored procedures that are typically exposed to the access layer. Such an arrangement can facilitate data access in a relational database with stored procedure. Moreover, information about the database can be stored in one place, to mitigate a risk for such information being out of sync with that maintained in the middle tier.

20 Claims, 9 Drawing Sheets

DATA ACCESS LAYER CLASS GENERATOR

TECHNICAL FIELD

The subject invention relates generally to data access from databases with stored procedures, and more particularly to systems and methods that automatically generate a data access layer by analyzing such stored procedures.

BACKGROUND OF THE INVENTION

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. In general, a typical database can be referred to as an organized collection of information with data structured such that a computer program can quickly search and select desired pieces of data, for example. Traditionally, data within a database is organized via one or more tables, wherein respective tables comprise a set of records and a record includes a set of fields. Records are commonly indexed as rows within a table and the record fields are typically indexed as columns such that a row/column pair of indices can reference a particular datum within a table.

Currently, a vast majority of the world's databases are based on a relational data-model and access is most often dominated by variants of the SQL (structured query language) standard. SQL is a language that can be used to interrogate and process data in a relational database and, many corporations maintain organizational, product and customer data in SQL compatible databases—Originally developed for use in connection with mainframes, most database management systems (DBMSs) are now typically designed for client/server environments that support SQL.

The main application of a database management system is of course to manage storage, arrangement, and retrieval of data; however, in order to provide a variety of capabilities to the management system it is often desirable to employ stored procedures or predefined functions upon which the database management system can use to accomplish functions provided thereby. Database administrators frequently employ "stored procedures" that are built-in queries where only small parts (e.g., parameters) are changeable, to accommodate query searches. For example, a stored procedure can be defined to identify customers having a place of business in a particular zip code. Accordingly, the user would only have to input the value of the zip code in order to obtain query result(s). In other words, a user would call into the stored procedure and pass along a desired zip code as an identified parameter. Typically, there are a number of benefits in using stored procedures, including function encapsulation, performance enhancement, client-server processing, and security. Generally, stored procedures may take any number of parameters, which are defined internally within such procedures. Stored procedures may also be used to add, update, or remove information from one or more databases.

Also, during development of a database application, a developer will typically create stored procedures in a database, and then code up a data access layer component for a middle tier of the application—this can be employed to invoke the stored procedures and gather up any results that can then be passed on to the caller in a higher layer of the middle tier. The process of creating such data access layer involves duplicating various information in code, which is already present in the database. Yet, typically such an approach is inefficient and redundant, as errors can be introduced and maintenance problems can arise during duplication.

In addition, the application will not properly operate, if changes to the stored procedures are not accompanied by similar changes to the data access layer. Moreover, determining exactly what has changed in the stored procedures and updating the data access layer code is both tedious and error-prone.

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention provides for systems and methods that automatically generate a data access layer for a middle tier of a relational database application from the definition of stored procedures, via a data access layer generator. Such arrangement facilitates data access in a relational database with stored procedures. Thus, information about the database can be stored in one place and a risk for such information being out of sync with that maintained in the middle tier is mitigated.

According to a methodology of the subject invention, data from an extensible mark up language extension (XML) configuration file can be employed by the Data Access Layer Class Generator, to determine the stored procedures that are typically exposed to the access layer. As a result, the XML file can act as declaration file that delineates the Application Program Interface (API) to the database, and provide a list of stored procedures required to be exposed to the API, for example. In addition, such XML file can provide information that in general may not be easily accessible from the database, such as the names of result sets—if the stored procedure in fact returns such result sets. The result set can also have a logical primary key associated therewith that can be automatically setup.

In a related aspect, the XML configuration file can also contain information about coding conventions, so that parameters can be transformed from a transaction structured query language (SQL) basis to a .NET Framework. Accordingly, generated code can properly match a programming convention used by the middle tier programming language even though the stored procedures upon which the generated code is based uses a different programming convention. For example, the naming convention for parameters for SQL based stored procedures can be different from those typically used in the middle tier programming language. Based on the XML configuration file, the SQL based parameter names can be automatically converted to a naming convention appropriate for the middle tier programming language. The subject invention can, for example, generate C#™ code that can define the data access class, wherein to obtain an operational system, the rest of the middle source files can be added/compiled and deployed to the server. Thus and upon deployment, the system can include a database, a middle tier with a data access layer that is automatically generated by the data access layer generator—(the data access layer can provide communication with the database, wherein the middle tier backs internet information services (IIS) that can provide web services and HTTP service capabilities in general.) A user can then employ a web browser to browse web pages hosted by a web server (e.g., the IIS) that runs a server side scripting environment (e.g., as an Active Server Page), to invoke middle tier business logic components that further invoke the data access layer and the stored procedures in the database. Such stored procedures can return result sets and/or alternatively perform some useful side effect (e.g., inserting, updating or deleting data) without typically returning any result sets.

In accordance with yet another methodology of the subject invention, initially an XML configuration file can be parsed and correlated to determine how a class should be generated by the data access layer generator. Such can for example include: identification of the database to be examined, overall specifications for generating the results, information about stored procedures that can be accessed via the data access layer and the like. Next, information can be retrieved from the data base and preamble code can be generated that can include typical code for transaction support and code for opening the database in the data access layer.

If one or more results set are returned from the stored procedure (e.g., data is actually returned back), then metadata can be acquired from the database about such stored procedure. Parameters matching the type of parameters for these stored procedures can be generated thereafter, with a command object for invoking the stored procedure. Subsequently, the generated code can create a data set and data adapter. The data adapter can be employed to fill the dataset with the results of invoking the stored procedure. Next, the method header can be generated to return values that represent the dataset.

In the related aspect of non-result set returning stored procedure, metadata can be initially acquired from the database about that stored procedure, and a method can then be generated with parameters that match the types of parameters for the stored procedure. Next, the body of the generated method can create a command object for invoking the stored procedures, and parameters are created for the stored procedures that match the metadata information acquired from the database.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

Figure 1:
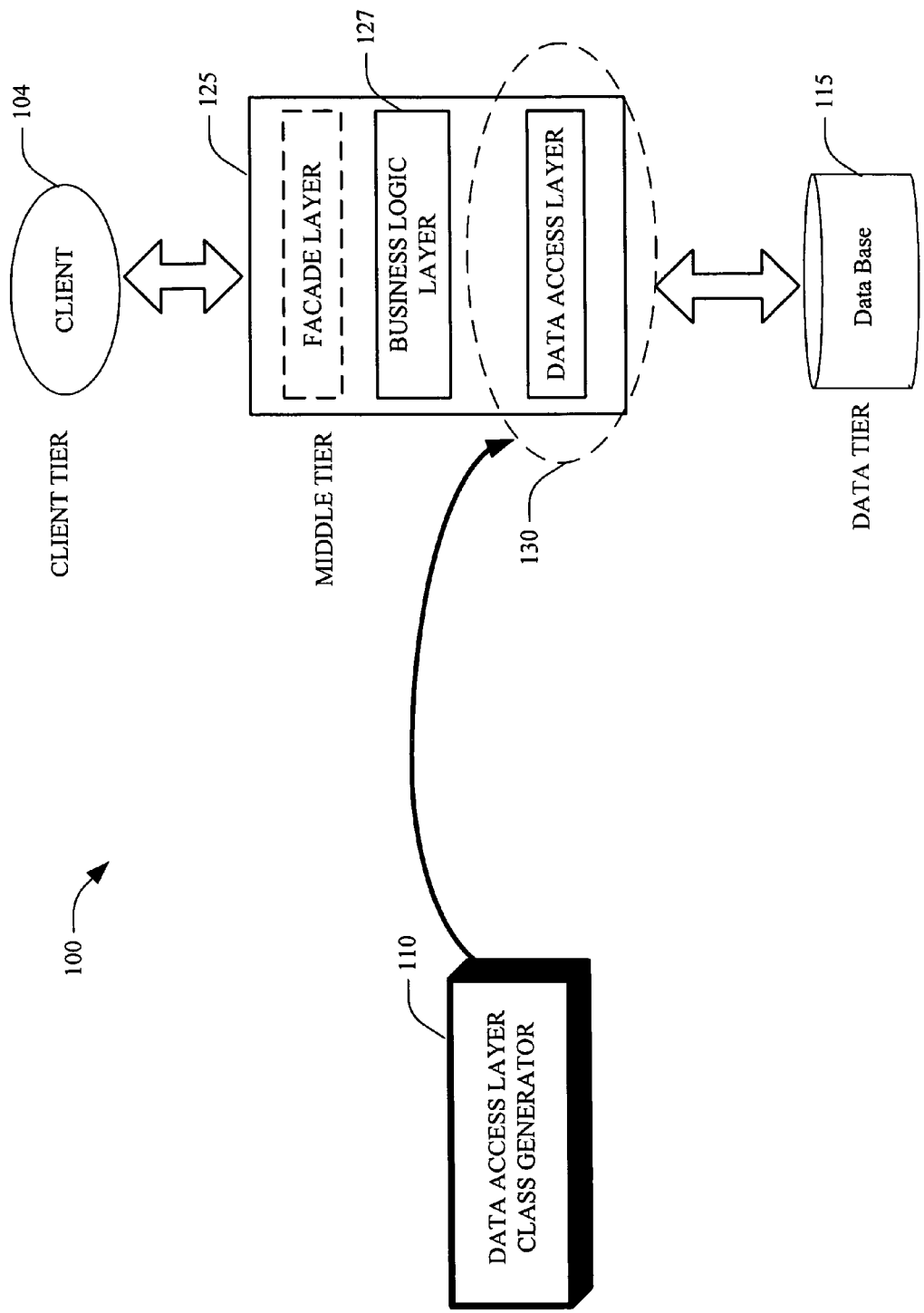
FIG. 1 illustrates a data access layer class generator that automatically generates a data access layer in accordance with an aspect of the subject invention.

Appendix A presented infra provides one particular exemplary set of schema for the XML configuration file in accordance with an aspect of the subject invention—this appendix is to be considered part of this specification describing the invention.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

The subject invention provides for systems and methods that automatically generate a data access layer of a relational database application from the definition of stored procedures, via a data access layer generator. Such an arrangement can facilitate data access in a relational database with stored procedures. Moreover, information about the database can be stored in one place, to mitigate a risk for such information being out of sync with information that is maintained in the middle tier. Put differently, the data access layer within the middle tier can be automatically generated via the data access layer generator of the subject invention.

FIG. 1 illustrates a multi-tiered client server architecture 100 with a data access layer generator 110 that automatically generates the data access layer 130 in the middle tier 125, in accordance with an aspect of the subject invention. A three physical tiered structure, namely; a client tier, a middle tier, and a database tier is provided, wherein the client tier 104 consists of the user workstations, PDAs, and other devices that can host a Web browser. For service-oriented solutions, this tier consists of the computers and devices that consume the service. Typically, in such multi-tiered arrangement 100, the client application process represents an application program running on a computer platform, wherein the computer platform can be the same as the server of the database, or it can be a remote computer platform connected to the server via some type of communication medium, such as a communication network.

The middle tier 125 can generally be responsible for hosting the application's business components and, in the case of Web applications, the Web servers as well. Such middle tier 125 can include a business logic layer 127 that performs operations on data passed back and forth through it, and between the data tier 115 and the client tier 104. The layer 127 primarily concerns the logic rather than the view of data or storage of the data. Such an arrangement typically supports scalability and fault tolerance, wherein the application tier can be configured as a server farm and the database tier as a server cluster.

The client tier 104 can interact with the relational database 115 by requesting web pages with or without various parameters. Accessing those web pages in turn invokes business logic components in the middle tier. Such business logic components then invoke data access layer components that in turn issue SQL statements, wherein the SQL statements are communicated to the relational database 115, for example. As such, the client 104 can indirectly issue a procedure call that can instruct the relational database 115 to execute one of the external predefined procedures. In the relational database 115, most of the data is commonly stored as rows in one or more tables. The database 115 can be accessed by one or a plurality of entities having the ability to perform associative queries over tables. Sets of entities stored in tables can be accessed using a set processing language (e.g., structured query language), wherein the language specifies one or more tables as the source of the data and outputs only those row(s), if any, that satisfy a given condition. The data access layer generator 110 can automatically create the data access layer 130 of middle tier 125. The data access layer 130 can be employed to invoke stored procedures in the database 115, and gather up any result that is then passed on the higher layers in the middle tier 125.

Figure 2:
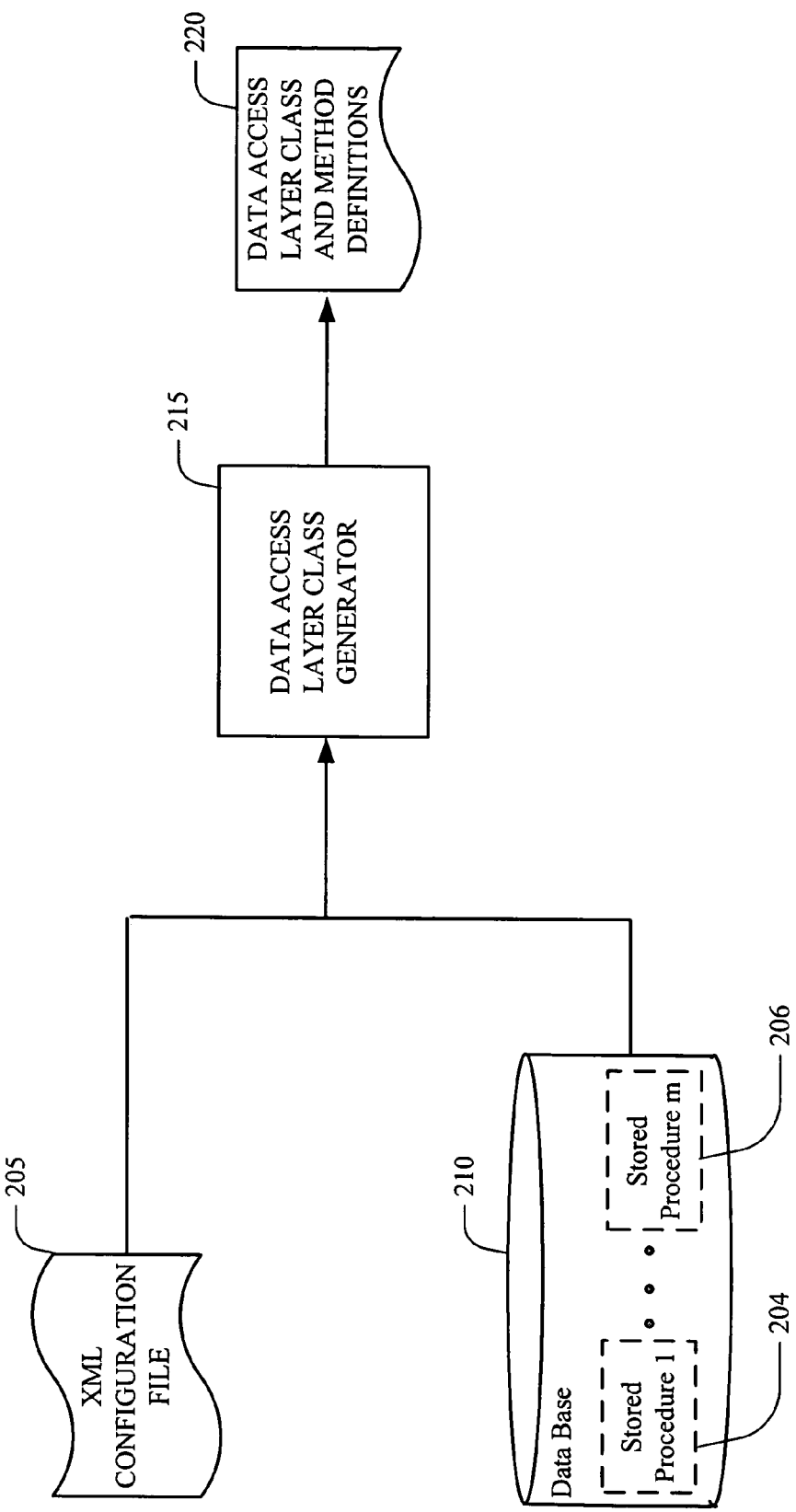
FIG. 2 illustrates a data access layer generator that employs an eXtensible Mark Up (XML) configuration file and the stored procedures of the database, to generate a data access layer in accordance with an aspect of the subject invention.

FIG. 2 illustrates a data access layer generator that automatically generates the data access layer via employing an eXtensible Mark Up (XML) configuration file and the stored procedures of the database. Typically, the stored procedures 204, 206 (1 thru m, where m is an integer) are programs (or procedures) that are physically stored within the database 210. Such programs are usually written in a proprietary database language and in response to a user request, run directly by the database engine.

The stored procedures 204, 206 have direct access to the data that requires manipulation, and typically need only send results back to the user, thus mitigating the overhead of communicating large amounts of data back and forth. For example, typical uses for stored procedures 204, 206 can include data validation, which is integrated into the database structure (stored procedures used for this purpose are often called triggers), or encapsulating some large or complex processing (such as manipulating a large dataset to produce a summarized result). Stored procedures 204, 206 can also be employed when the database 210 is manipulated from many external programs. By embedding business logic in the database 210 using stored procedures, the need to embed the same logic in all the programs which access the data is reduced. Such can simplify the creation and, particularly, the maintenance of the programs involved.

As illustrated in FIG. 2, the data access layer generator 215 can automatically create the data access layer class and method definitions 220, via the aid of XML configuration file 205. The XML configuration file 205 can be parsed and correlated to determine how a class should be generated by the data access layer class generator 215. Such can for example, include identification of the database to be examined, overall specifications for generating the results, information about stored procedures that can be accessed via the data access layer 220 and the like. Next, information can be retrieved from the data base 210 and a preamble code be generated that can include typical code for transaction support and code for opening the database in the data access layer. The XML configuration file 205 can determine the stored procedures that are typically exposed to the access layer. Accordingly, the XML file can act as a declaration file that delineates the Application Program Interface (API) to the database, and provide a list of stored procedures required to be exposed to the API, for example. In addition, such XML file can provide information that in general may not be easily accessible from the database, such as the names of result sets—if the stored procedure in fact does return such result sets. The result set can also have a logical primary key associated therewith that can be automatically setup.

An exemplary schema that can be part of the configuration file 205 is presented at the end of this document, as part of appendix A. As explained supra, such exemplary schema can for example be in form of an eXtensible Markup Language (XML) that can define and describe a class of XML documents using schema constructs of an XML schema language. These schema constructs can be used to constrain and document the meaning, usage, and relationships of data types, elements and their content, attributes and their values, entities, contents and notations, as used in XML documents. Thus, in general any computer system that can access an XML schema can process XML documents in accordance with the XML schema. Furthermore, typically any computer system that can access an XML schema can compose or modify XML documents for use by other computer systems that can also access the XML schema. A schema can be utilized to define virtually any data type including logical, binary, octal, decimal, hexadecimal, integer, floating-point, character, character string, user-defined data types, and combinations of these data types used to defined data structures. XML elements and attributes can be defined to represent data types that are defined by a schema. An exemplary XML schema in accordance with a particular aspect of the subject invention is presented as part of appendix A—infra.

In a related aspect, the XML configuration file can also contain information about coding conventions, so that parameters can be transformed from a transaction SQL basis to a ".NET" Framework. Accordingly, generated code can properly match a programming convention used by the middle tier programming language even though the stored procedures upon which the generated code is based uses a different programming convention. For example, the naming convention for parameters for SQL based stored procedures might well be different from those typically used in the middle tier programming language. Based on the XML configuration file, the SQL based parameter names can be automatically converted to a naming convention appropriate for the middle tier programming language. The subject invention may, for example, generate C#™ code that can define the data access class, wherein to obtain an operational system, the rest of the middle source files can be added/compiled and deployed to the server.

Figure 3A:
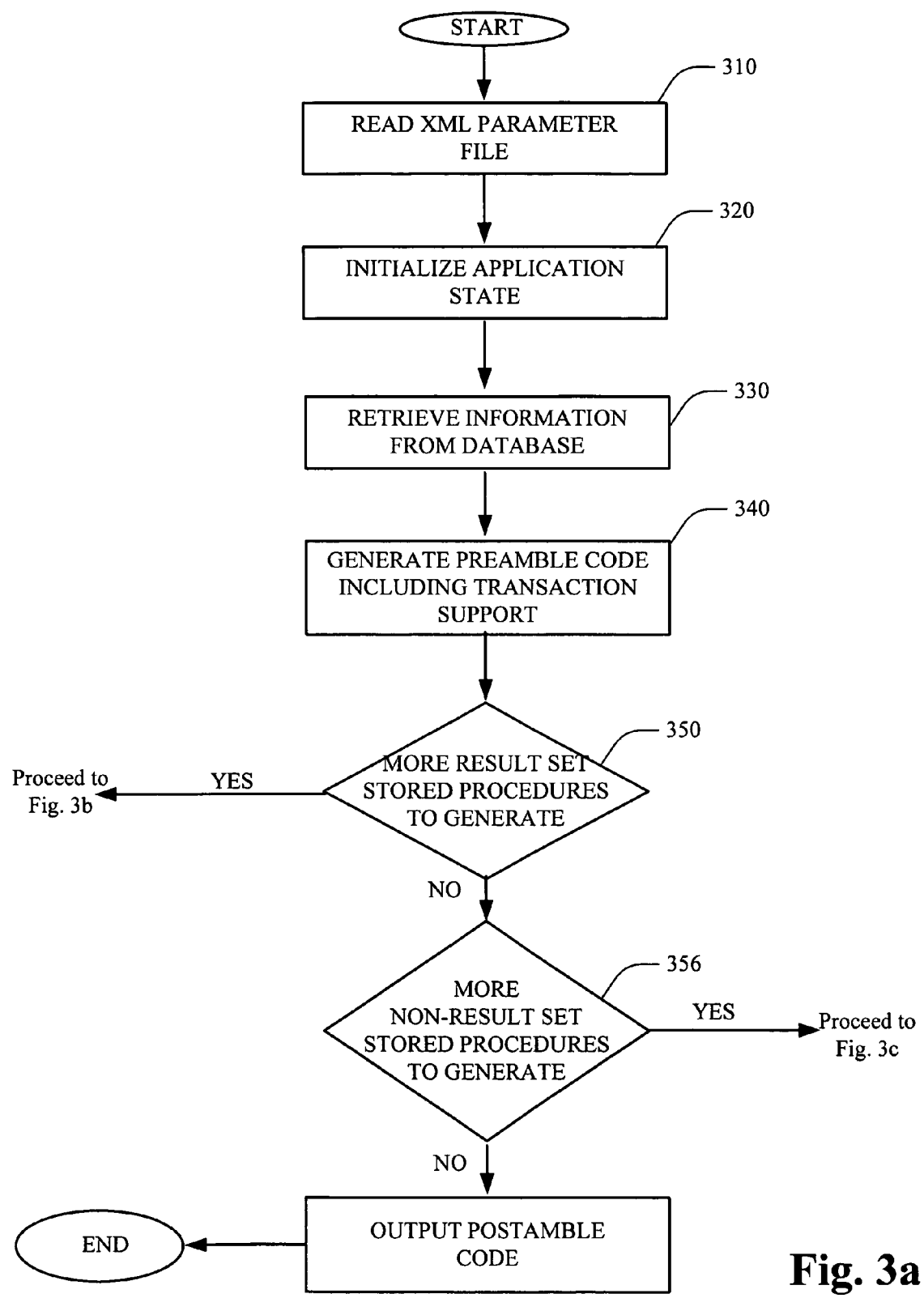
FIGS. 3a, 3b, and 3c illustrate a methodology of generating a data access layer class in accordance with an aspect of the subject invention.

Referring now to FIG. 3a, an exemplary methodology of a data access layer class generation in accordance with an aspect of the subject invention is illustrated. While this exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially and at 310, the XML parameter file can be read, to typically drive the rest of the process—(a parameter file must in general comply with such schema, as it is read and validated against the schema.)

For example, the XML that the customer or user is providing can initially be verified, and then based on the content of the XML file the application stage can be initialized at 320—wherein the information can be captured as objects manipulated by the application. Next and at 330, type information can be retrieved from the database, including examination of: the stored procedures in the database, any related info type that can be beneficial, and capture of such info in the object model, for example. Subsequently and at 340, a preamble code is generated that can include transaction support. The preamble code can include a certain amount of fixed code for an access layer, typically generated regardless of which database is examined such as; code for transaction support and protocols for opening the database in the data access layer. Depending on whether the stored procedures can produce result sets or not, the methodology of the subject invention can be split in to two separate methodology branches.

Figure 3B:
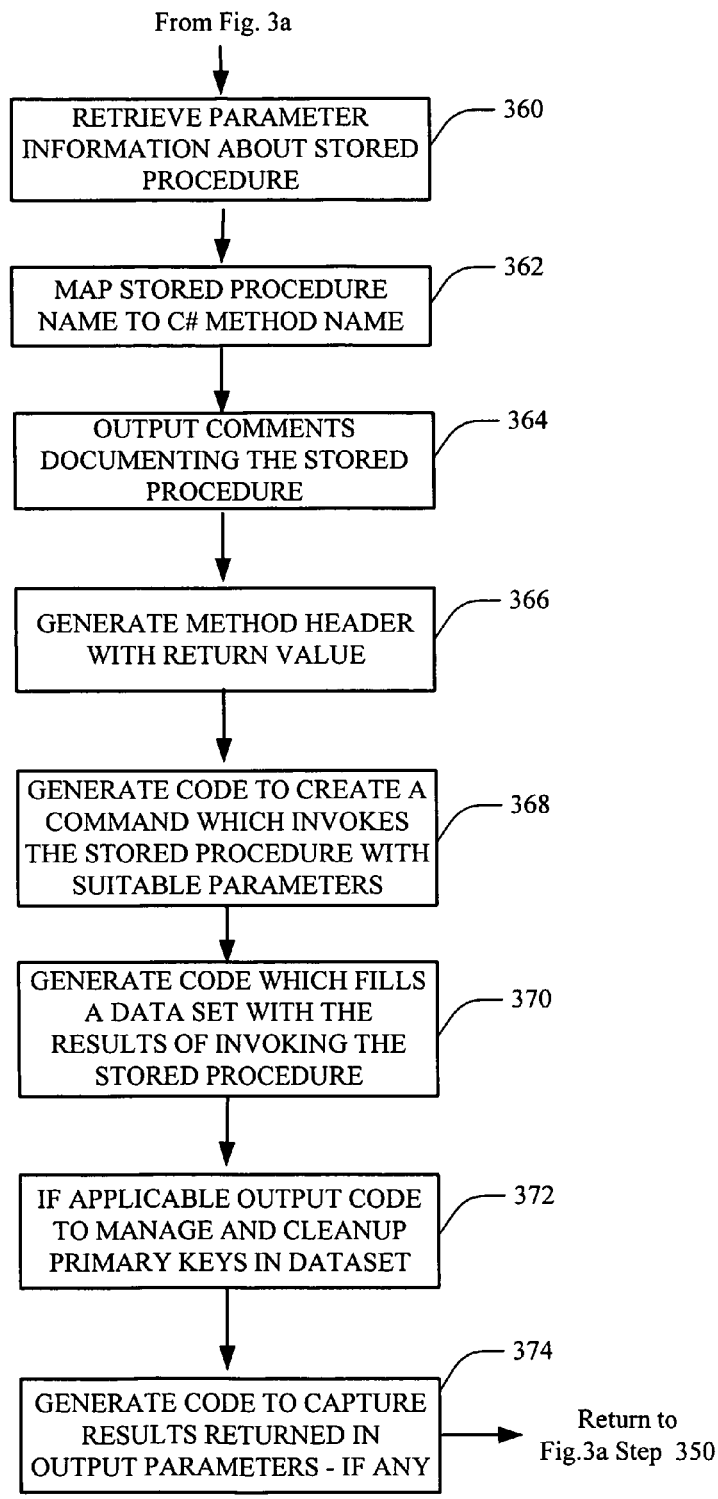

If the stored procedures returns one or more result sets, (e.g., results of a search for a catalog displayed to a user) the methodology proceeds to FIG. 3b. As illustrated at 360 of FIG. 3b, parameter information regarding the stored procedure can be automatically fetched from the database. Accordingly, if the stored procedures are accurately represented, then proper parameter information can be automatically gathered. Next, and at 362 attributes can be mapped, for example from stored procedure names to object oriented programming names (e.g., C#™ names). Subsequently, and at 364 comments are outputted that can document the procedure that invokes the stored procedure in a class. The methodology then proceeds to 366, wherein method header can be generated with return values that can represent the dataset. Next and at 368, code can be generated to create commands that invoke a particular stored procedure with suitable parameters. Put differently, the type information fetched earlier from the database can be combined with information from the parameter file to generate a method that invokes the particular stored procedure, which in turn returns the result set.

The methodology then proceeds to 370, wherein code can be generated that fills the dataset with results of invoking the stored procedures, to obtain data from the database. Moreover, if in the parameter file there exists a logical primary key associated with a logical table that is created based on the output from executing the query against the database, then code can be generated to support this at 372. Such code can facilitate creating and/or maintaining data integrity in the middle tier. Also, if in addition to returned result sets there are any specific values for output parameters returned, code for capturing and returning such values can be generated at 374. The methodology can then loop back to 350 of FIG. 3a, and check for more result set stored procedures to be generated.

Figure 3C:
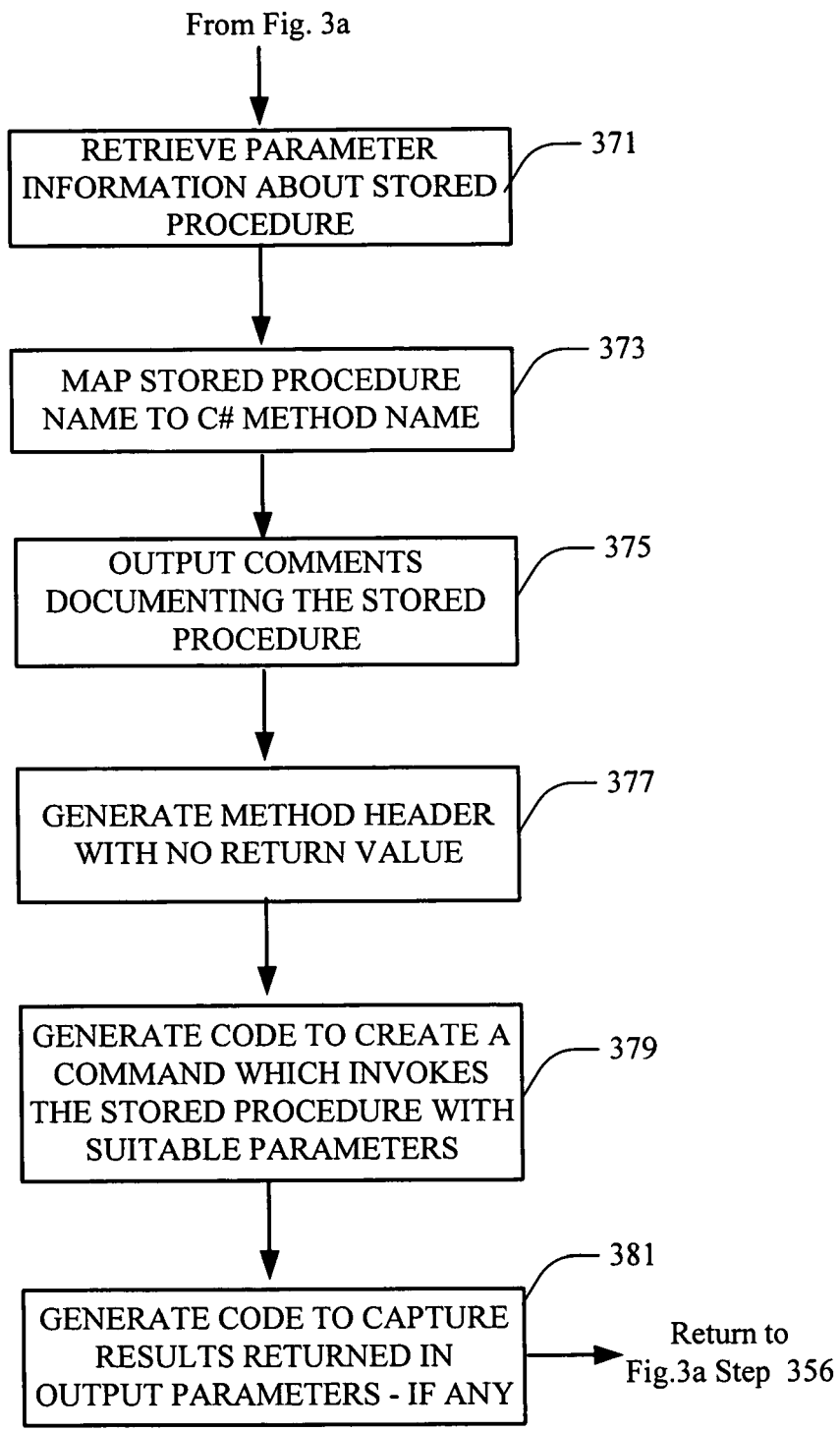

Alternatively, if the stored procedures do not return a result set at 356 of FIG. 3a, (e.g., creating a customer, or inserting a name) the methodology proceeds to FIG. 3c. As illustrated at 371 of FIG. 3c, parameter information regarding the stored procedure can be automatically fetched from the database. Next, and at 373 attributes can be mapped, for example from stored procedure names to object oriented programming names (e.g., C#™ names). Subsequently, and at 375 comments are outputted that can document the procedure that invokes the stored procedure in a class. The methodology then proceeds to 377, wherein method header can be generated with no return values, as they are void. Next and at 379, code can be generated to create commands that invoke a particular stored procedure with suitable parameters. Also, if there are any specific values for output parameters returned, code for capturing and returning such values can be generated at 381. The methodology can then loop back to check for more non-result set stored procedures to generate.

For example, for a banking application that employs a data base in SQL, stored procedures can be written for creating an account and for updating information about an existing account in SQL. Such a database can be typically defined according to tables and columns, wherein the relationships between tables can form the logical components of the relational database. The logical elements can readily represent the semantics of the database, facilitate mapping the database to another data model, and the like. Also, the database tables can be converted into XML documents and XML tools can be employed with these documents for further processing of financial applications.

In such database environment, the stored procedure for creating or updating an account can typically be considered non-result set stored procedures. For example, in the case of the stored procedure for creating an account, an out put parameter can be returned with a Customer ID, without a table set of results, wherein the data access layer class generator can obviate the requirement for re-drafting code or information such as; the C#™ source code for the middle tier that could invoke the stored procedures. Thus, embedded in the method definitions for the class would be information about the order, names, types and sizes of parameters, wherein the exact sample information would also be part of the stored procedure definition.

As requirements for the banking application change, the application dealing with overdraft protection account may become necessary, or the account creation and account update stored procedures typically need to be modified to incorporate another parameter, such as the overdraft limit. The subject invention can obviate or mitigate the requirement to manually update the data access layer C#™ code, wherein any variance in the number, type, or size of the parameters between the stored procedures and middle tier code can introduce errors. Thus, by employing the data access layer class generator of the subject invention, changes typically need only be incorporated as part of the definition of the stored procedures. The data access layer class would then be regenerated, producing a new version of that component which would be compatible with the latest stored procedure definitions. Such can dramatically reduce the amount of effort required for updating an application with hundreds or thousands of stored procedures.

Figure 4:
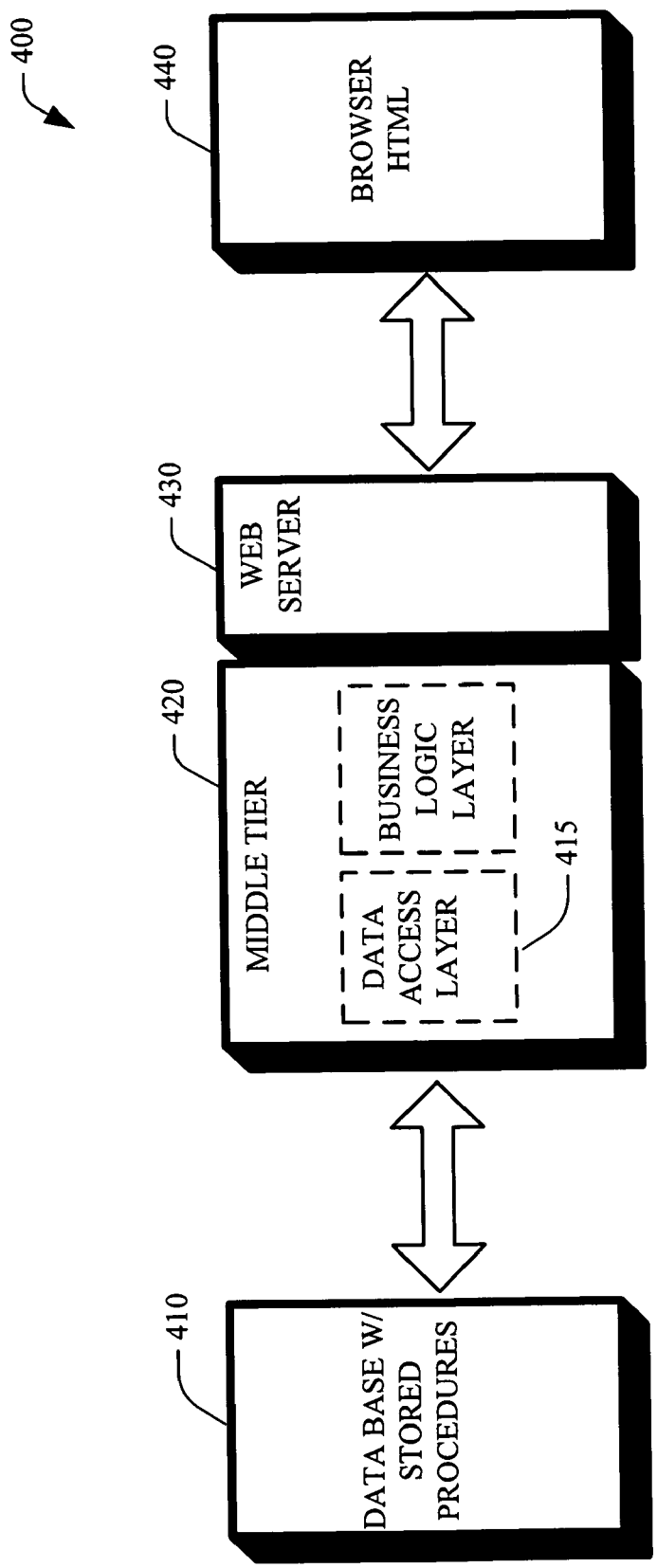
FIG. 4 illustrates a deployed system that employs a data access layer class generator in accordance with an aspect of the subject invention.

FIG. 4 illustrates a deployed system in accordance with an aspect of the subject invention, wherein the system 400 can include a database 410, a middle tier 420 with a data access layer 415 that is automatically generated by the data access layer generator. Such data access layer 415 can provide communication with the database 410, wherein the middle tier 420 backs an Internet Information Services (IIS) based web application that implements web services and server side web user interface components 430, 440. A user can then employ a web browser to browse web pages served by a web server (e.g., IIS) that can call upon business logic components in the middle tier, which in turn can invoke components in the data access layer 415, to summon the stored procedures in the database 410. These stored procedures can return result sets and/or alternatively provide no results sets.

Figure 5:
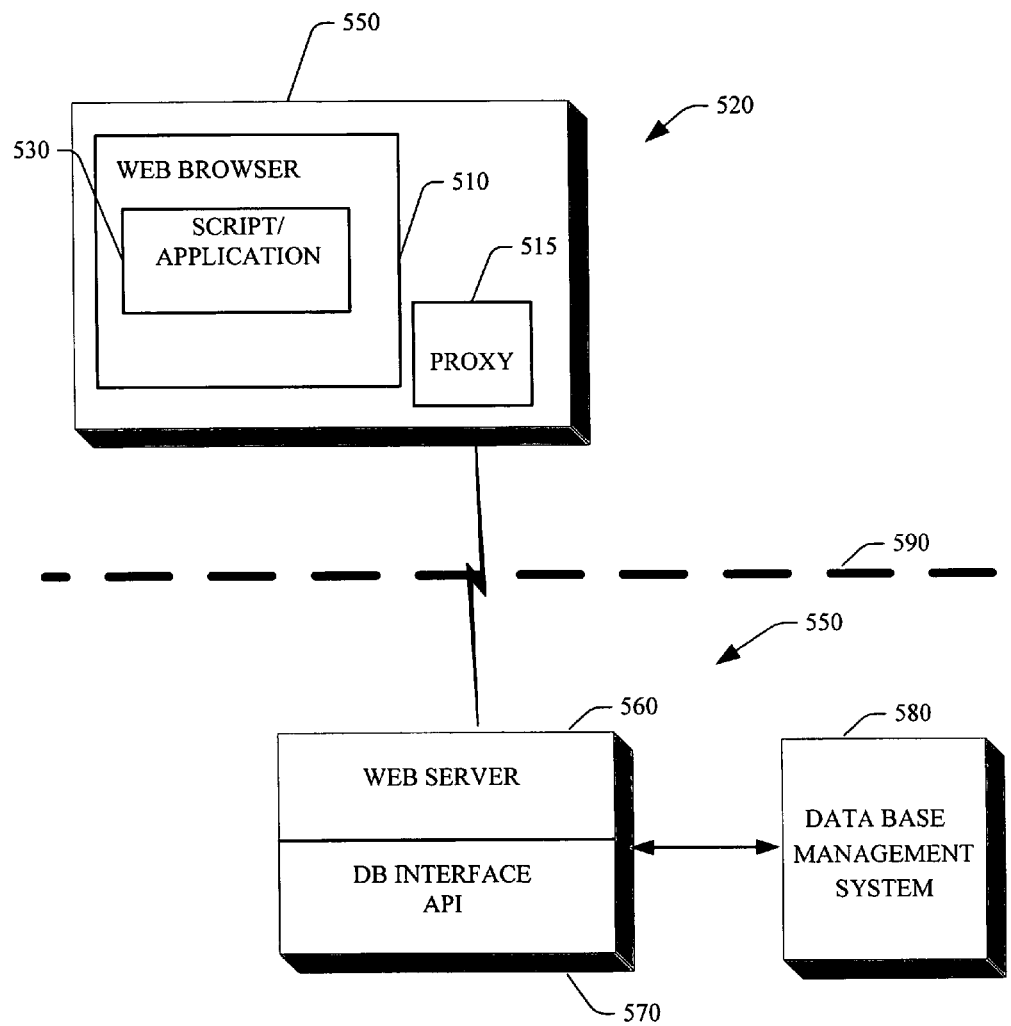
FIG. 5 illustrates a web browser in communication with a web server as part of a multi-tiered structure, wherein a data access layer can be automatically generated in accordance with an aspect of the subject invention.

Referring now to FIG. 5, there is illustrated a web browser in communication with a web server as part of a multi-tiered structure, wherein a data access layer can be automatically generated as described in detail supra. Running on the client 520 is a client process such as a web browser 510 and likewise, running on the server 550 is a corresponding server process, for example, a web server 560. In addition, embedded in the Web Browser 510 can be a script or application 530, and running within the run-time environment 550 of the client computer 520, can exist a proxy 515 for packaging and unpacking data packets formatted in accordance with various aspects of the subject invention. Communicating with the server 550 is a database management system (DBMS) 580, which manages access to a database (not shown). The DBMS 580 and the database (not shown) can be located in the server itself, or can be located remotely on a remote database server (not shown). Running on the Web server 560 is a database interface Applications Programming Interface (API) 570, which provides access to the DBMS 580. As explained supra, an XML configuration file can determine the stored procedures that are typically exposed to the access layer. Accordingly, the XML file can for example act as declaration file that delineates the API 570 to the database, and provide a list of stored procedures required to be exposed to the API.

The client computer 520 and the server computer 550 can communicate with each other through a network 590. When the client process, e.g., the Web browser 510, requests data from a database, the script or application 530 issues a query that is sent across the network (e.g. Internet) 590 to the server computer 550, where it then is interpreted by the server process, e.g., the Web server 560. The client's 520 request to server 550 can contain multiple commands, and a response from server 550 can return a plurality of result sets. Responses to client commands that are returned can be self-describing, and record oriented; (e.g. the data streams can describe names, types and optional descriptions of rows being returned.) Also, the generated code can properly match a programming convention used by the middle tier programming language even though the stored procedures upon which the generated code is based uses a different programming convention. For example, the naming convention for parameters for SQL based stored procedures might well be different from those typically used in the middle tier programming language. Based on the XML configuration file, the SQL based parameter names can be automatically converted to a naming convention appropriate for the middle tier programming language. The subject invention may, for example, generate C#™ code that can define the data access class, wherein to obtain an operational system, the rest of the middle source files can be added/compiled and deployed to the server.

Figure 6:
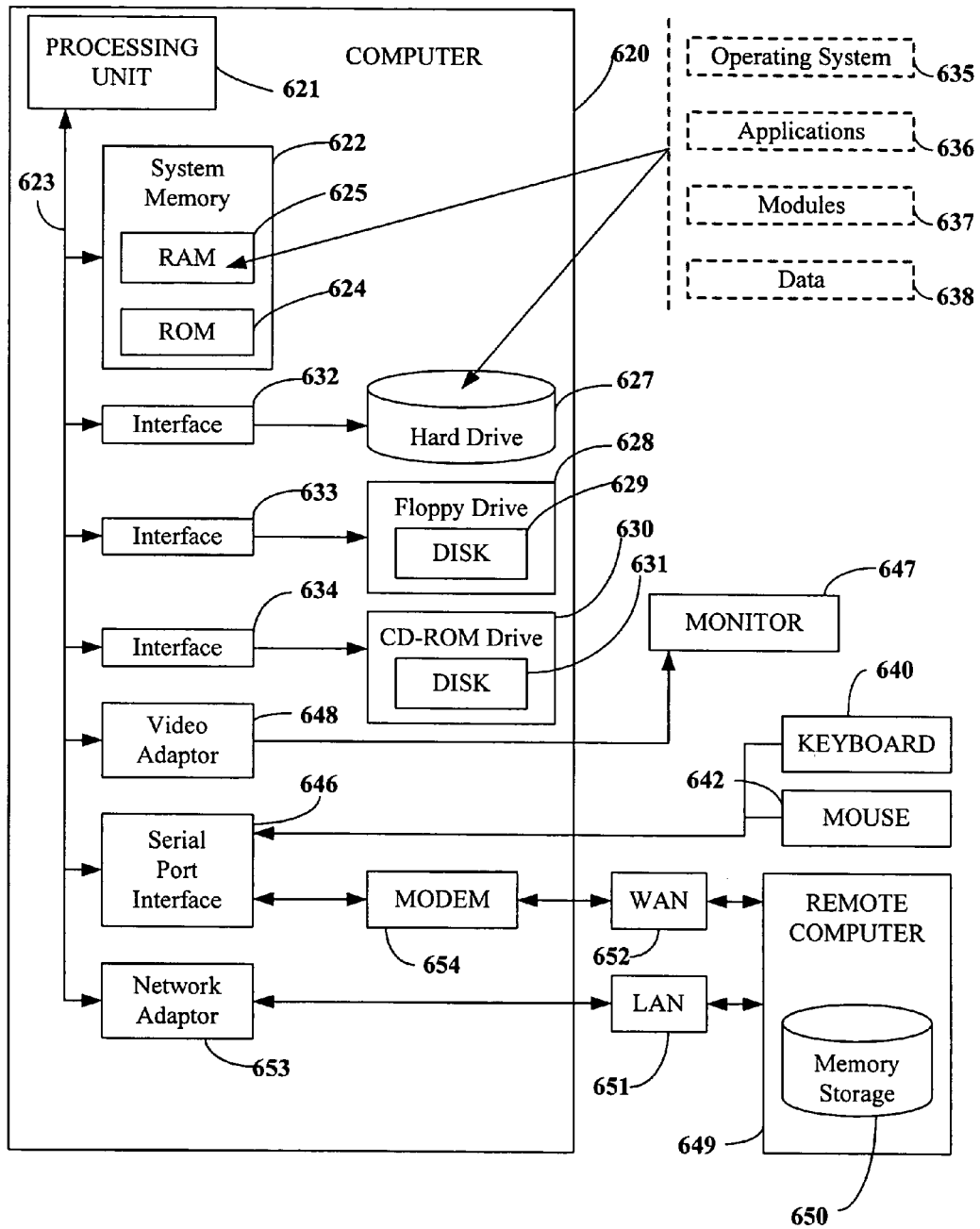
FIG. 6 illustrates a brief, general description of a suitable computing environment wherein the various aspects of the subject invention can be implemented.

Referring now to FIG. 6, a brief, general description of a suitable computing environment is illustrated wherein the various aspects of the subject invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary environment includes a computer 620, including a processing unit 621, a system memory 622, and a system bus 623 that couples various system components including the system memory to the processing unit 621. The processing unit 621 can be any of various commercially available processors. Dual microprocessors and other multi-processor architectures also can be used as the processing unit 621.

The system bus can be any of several types of bus structure including a memory bus or memory controller, a peripheral bus, and a local bus using any of a variety of commercially available bus architectures. The system memory may include read only memory (ROM) 624 and random access memory (RAM) 625. A basic input/output system (BIOS), containing the basic routines that help to transfer information between elements within the computer 620, such as during start-up, is stored in ROM 624.

The computer 620 further includes a hard disk drive 627, a magnetic disk drive 628, e.g., to read from or write to a removable disk 629, and an optical disk drive 630, e.g., for reading from or writing to a CD-ROM disk 631 or to read from or write to other optical media. The hard disk drive 627, magnetic disk drive 628, and optical disk drive 630 are connected to the system bus 623 by a hard disk drive interface 632, a magnetic disk drive interface 633, and an optical drive interface 634, respectively. The drives and their associated computer-readable media provide nonvolatile storage of data, data structures, computer-executable instructions, etc. for the computer 620. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 625, including an operating system 635, one or more application programs 636, other program modules 637, and program data 638. The operating system 635 in the illustrated computer can be substantially any commercially available operating system.

A user can enter commands and information into the computer 620 through a keyboard 640 and a pointing device, such as a mouse 642. Other input devices (not shown) can include a microphone, a joystick, a game pad, a satellite dish, a scanner, or the like. These and other input devices are often connected to the processing unit 621 through a serial port interface 646 that is coupled to the system bus, but may be connected by other interfaces, such as a parallel port, a game port or a universal serial bus (USB). A monitor 647 or other type of display device is also connected to the system bus 623 via an interface, such as a video adapter 648, and be employing the various aspects of the invention as described in detail supra. In addition to the monitor, computers typically include other peripheral output devices (not shown), such as speakers and printers. The power of the monitor can be supplied via a fuel cell and/or battery associated therewith.

The computer 620 can operate in a networked environment using logical connections to one or more remote computers, such as a remote computer 649. The remote computer 649 may be a workstation, a server computer, a router, a peer device or other common network node, and typically includes many or all of the elements described relative to the computer 620, although only a memory storage device 650 is illustrated in FIG. 6. The logical connections depicted in FIG. 6 may include a local area network (LAN) 651 and a wide area network (WAN) 652. Such networking environments are commonplace in offices, enterprise-wide computer networks, Intranets and the Internet.

When employed in a LAN networking environment, the computer 620 can be connected to the local network 651 through a network interface or adapter 653. When utilized in a WAN networking environment, the computer 620 generally can include a modem 654, and/or is connected to a communications server on the LAN, and/or has other means for establishing communications over the wide area network 652, such as the Internet. The modem 654, which can be internal or external, can be connected to the system bus 623 via the serial port interface 646. In a networked environment, program modules depicted relative to the computer 620, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 620, unless otherwise indicated. Such acts and operations are sometimes referred to as being computer-executed. It will be appreciated that the acts and symbolically represented operations include the manipulation by the processing unit 621 of electrical signals representing data bits which causes a resulting transformation or reduction of the electrical signal representation, and the maintenance of data bits at memory locations in the memory system (including the system memory 622, hard drive 627, floppy disks 628, and CD-ROM 631) to thereby reconfigure or otherwise alter the computer system's operation, as well as other processing of signals. The memory locations wherein such data bits are maintained are physical locations that have particular electrical, magnetic, or optical properties corresponding to the data bits.

Figure 7:
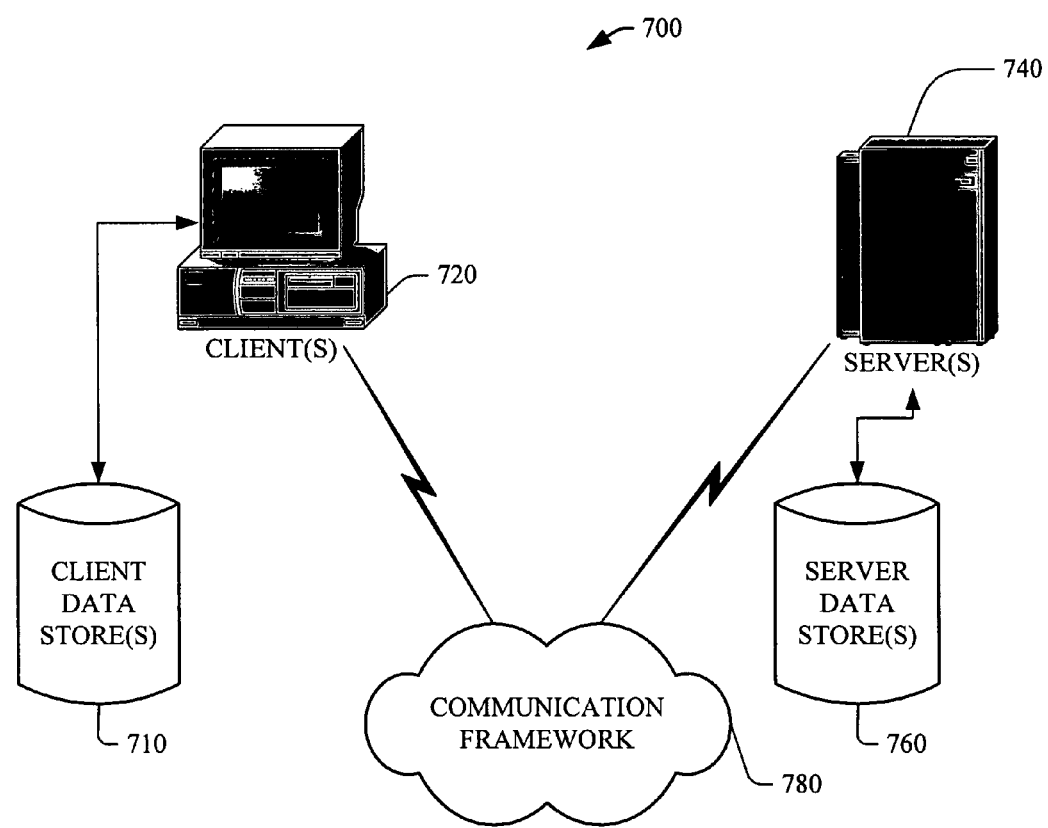
FIG. 7 illustrates a client—server system that can employ various aspects of the subject invention for generation of the data access layer in accordance with the subject invention.

Referring now to FIG. 7 a client—server system 700 that can employ various aspects of the subject invention for wireless display on the client or server side, is illustrated. The client(s) 720 can be hardware and/or software (e.g., threads, processes, computing devices). The system 700 also includes one or more server(s) 740. The server(s) 740 can also be hardware and/or software (e.g., threads, processes, computing devices). The client 720 and the server 740 can communicate, in the form of data packets transmitted according to the subject invention, between two or more computer processes. As illustrated, the system 700 includes a communication framework 780 that can facilitate communications between the client(s) 720 and the server(s) 740, and/or the respective display monitors. The client(s) 720 is operationally connected to one or more client data store(s) 710 that can store information local to the client(s) 720. Moreover, client 720 can access and update databases 760 located on a server computer 740 running a server process. In one aspect of the subject invention, the communication framework 780 can be the Internet, with the client process being a Web browser and the server process being a Web server.

As such, a typical client 720 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 740 can be university or corporate mainframe computers, or dedicated workstations, and the like.

A sample XML schema that provides an example for the configuration file according to the subject invention is provided infra, as part of appendix A, and this appendix is to be considered part of this specification describing the invention.

Moreover, although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

APPENDIX A

<?xml version="1.0"?>
<xs:schema
targetNamespace="http://schemas.microsoft.com/SqlServer/Data AccessClass"
    xmlns:xs="http://www.w3.org/2001/XMLSchema"

APPENDIX A-continued

```
elementFormDefault="qualified"
attributeFormDefault="unqualified">
    <xs:element name="parameters">
        <xs:complexType>
            <xs:sequence>
                <xs:element name="connectionString">
                    <xs:complexType>
                        <xs:attribute name="value"
type="xs:string" use="required"/>
                    </xs:complexType>
                </xs:element>
                <xs:element name="handcodedSprocs"
minOccurs="0">
                    <xs:complexType>
                        <xs:attribute name="file"
type="xs:string" use="required"/>
                    </xs:complexType>
                </xs:element>
                <xs:element name="prefixToRemove"
minOccurs="0">
                    <xs:complexType>
                        <xs:sequence>
                            <xs:element
name="sprocNamePrefix" type="xs:string"
                                minOccurs="0"
maxOccurs="unbounded"/>
                            <xs:element
name="sprocArgPrefix" type="xs:string"
                                minOccurs="0"
maxOccurs="unbounded"/>
                        </xs:sequence>
                        <xs:attribute
name="isSprocArgInitialLowerCase" type="xs:boolean"/>
                    </xs:complexType>
                </xs:element>
                <xs:element name="timeout">
                    <xs:complexType>
                        <xs:attribute name="command"
type="xs:string" use="required"/>
                    </xs:complexType>
                </xs:element>
                <xs:element name="output">
                    <xs:complexType>
                        <xs:sequence>
                            <xs:element name="using"
type="xs:string" maxOccurs="unbounded"/>
                        </xs:sequence>
                        <xs:attribute name="file"
type="xs:string" use="required"/>
                        <xs:attribute
name="namespace" type="xs:string" use="required"/>
                        <xs:attribute name="class"
type="xs:string" use="required"/>
                    </xs:complexType>
                </xs:element>
                <xs:choice minOccurs="0"
maxOccurs="unbounded">
                    <xs:element name="dsSproc">
                        <xs:complexType>
                            <xs:sequence>
                                <xs:element
name="table" maxOccurs="unbounded">
    <xs:complexType>
    <xs:sequence>
    <xs:element name="primaryKey" minOccurs="0"
maxOccurs="unbounded">
    <xs:complexType mixed="true">
    <xs:attribute name="fixupType" type="xs:string"/>
    </xs:complexType>
    </xs:element>
    </xs:sequence>
    <xs:attribute name="name" type="xs:string"
use="required"/>
    </xs:complexType>
                                </xs:element>
                            </xs:sequence>
                            <xs:attribute
name="name" type="xs:string" use="required"/>
                            <xs:attribute name="schema"
type="xs:string" use="optional" default="dbo"/>
                        </xs:complexType>
                    </xs:element>
                    <xs:element name="ndsSproc"
minOccurs="0" maxOccurs="unbounded">
                        <xs:complexType>
                            <xs:attribute
name="name" type="xs:string" use="required"/>
                            <xs:attribute name="schema"
type="xs:string" default="dbo"/>
                        </xs:complexType>
                    </xs:element>
                </xs:choice>
            </xs:sequence>
        </xs:complexType>
    </xs:element>
</xs:schema>
```

What is claimed is:

1. A system that facilitates data access to a database comprising:
a generator that automatically generates a data access layer based on a configuration file and stored procedures in a database and,
a middle tier component that employs the data access layer to access the database.

2. The system of claim 1 the configuration file is an extensible Markup Language (XML) file that acts as a declaration file to delineate an Application Program Interface (API).

3. The system of claim 2 the XML configuration further includes coding conventions to transform parameters from a transaction Structured Query Language (SQL) basis to a Net framework.

4. The system of claim 3 further comprises a code that bridges a gap between a SQL and a .Net framework.

5. The system of claim 4, the code is C#™ code.

6. A method of accessing a database comprising:
parsing an XML configuration file by a data class generator;
coordinating data in the file with stored procedures stored in the database; and
automatically generating a data access layer for a middle tier by the data class generator.

7. The method of claim 6 further comprising accessing the database middle tier.

8. The method of claim 6 further comprising generating codes to create commands to invoke a stored procedure in the database.

9. The method of claim 6 further comprising automatically fetching parameter commands for the stored procedures from the database.

10. The method of claim 6 further comprising outputting comments that document a procedure that invokes stored procedures.

11. The method of claim 6 further comprising defining a data access class for the data access layer.

12. The method of claim 6 further comprising retaining one of a result set and a non-result set from the database.

13. The method of claim 6 further comprising creating a preamble code.

14. The method of claim 13 further comprising mapping stored procedure names to object oriented programming names.

15. The method of claim 6 further comprising capturing parameters associated with output parameters invoked from the stored procedures.

16. The method of claim 15 further comprising passing the captured parameters to a client tier.

17. A system that facilitates data access comprising:
  means for generating a data access layer based on a configuration file and stored procedures in a database; and
  means for accessing the database.

18. The system of claim 17 further comprising means for delineating an Application Program Interface.

19. The system of claim 17 further comprising means for transforming parameters from a transaction Structured Query Language (SQL) basis to a Net framework.

20. The system of claim 17 further comprising means for bridging a gap between a SQL and a .Net framework.

* * * * *

UNITED STATES PATENT AND TRADEMARK OFFICE
CERTIFICATE OF CORRECTION

| | | |
|---|---|---|
| PATENT NO. | : 8,103,644 B2 | Page 1 of 1 |
| APPLICATION NO. | : 11/033646 | |
| DATED | : January 24, 2012 | |
| INVENTOR(S) | : Bonnie N. Feinberg | |

It is certified that error appears in the above-identified patent and that said Letters Patent is hereby corrected as shown below:

In column 14, line 31, in Claim 3, delete "Net" and insert -- .Net --, therefor.

In column 16, line 3, in Claim 19, delete "Net" and insert -- .Net --, therefor.

Signed and Sealed this
Thirteenth Day of March, 2012

David J. Kappos
*Director of the United States Patent and Trademark Office*